Patented Oct. 24, 1944

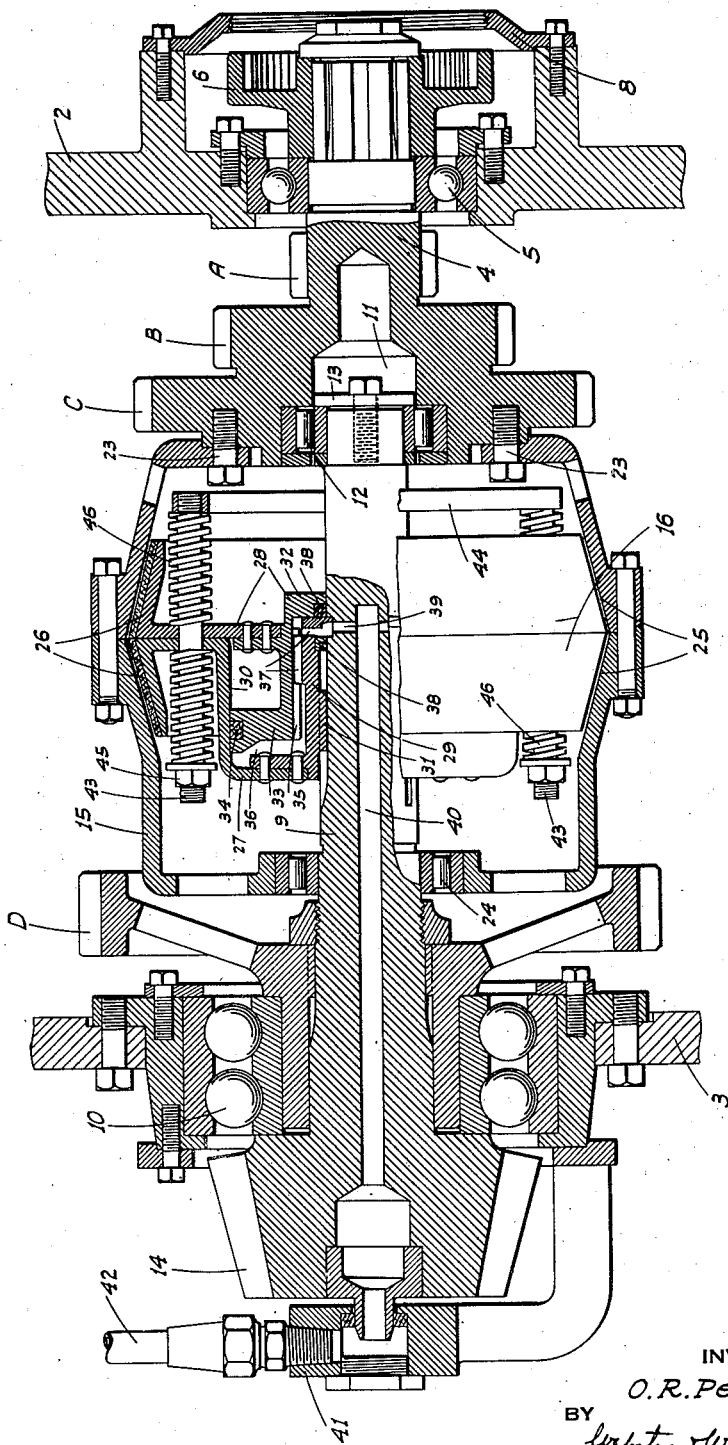

2,361,120

UNITED STATES PATENT OFFICE 2,361,120

CLUTCH UNIT

Oscar Raymond Peterson, Peoria, Ill., assignor to R. G. Le Tourneau, Inc., Stockton, Calif., a corporation of California Application July 12, 1943, Serial No. 494,314

4 Claims. (Cl. 192—85)

This invention relates in general to, and it is an object to provide, an improved fluid pressure actuated clutch unit; the present structure representing a modification of the clutch unit shown in U. S. Patent No. 2,351,876, dated June 20, 1944.

Another object of the present invention is to provide a clutch unit, as above, which is especially useful in vehicle transmissions of the type wherein the gears of the several stages remain in mesh at all times, and wherein each stage includes and is controlled by a separate clutch unit.

A further object of this invention is to provide a clutch unit which includes a unique annular piston and cylinder assembly operative to urge the movable parts of the male clutch assembly into clutch engaging position; and which clutch unit also includes a novel spring assembly operative to return said movable parts of the male clutch assembly to normal clutch disengaging position.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

The figure of the drawings is a longitudinal sectional elevation of the clutch unit.

Referring now more particularly to the characters of reference on the drawing, the clutch unit here shown is adapted for use in a transmission which includes a case having a front wall 2 and a rear wall 3 disposed in parallel relation. An input shaft 4 extends into the case through wall 2 and is supported by a bearing 5. Exteriorly of wall 2 the shaft 4 is fitted with an outwardly opening, interiorly splined and grooved cup 6 in which a complementary drive shaft is adapted to engage. An oil retaining device 8 is mounted in connection with wall 2 and surrounds the drive shaft adjacent and outwardly of the cup 6.

Inwardly of the wall 2, the input shaft 4 is relatively short, and an output shaft 9 is axially alined therewith and extends from adjacent the inner end of shaft 4 through a bearing 10 in wall 3. The inner end of shaft 4 is formed with an axial socket 11 into which the corresponding end of shaft 9 projects; the latter being relatively rotatably supported by a bearing 12 fixed in the outer end of socket 11 and held against axial escape by suitable means such as an end plate 13. Outwardly of wall 3 the shaft 9 is formed with a bevel drive pinion 14 adapted for connection with the driving mechanism of the vehicle.

The shafts 4 and 9, when coupled together by the clutch unit, which is the subject of this invention, constitute one stage of the transmission, here shown as the direct drive stage. This clutch unit includes a rotary housing 15 which forms the female clutch assembly, and which housing encloses a male clutch assembly 16 secured on the shaft 9.

The direct-drive clutch unit, of which housing 15 forms a part, is relatively short axially and its ends are spaced from the walls 2 and 3 of the case 1. The shaft 4 between wall 2 and the adjacent end of housing 15 is formed with three drive pinions indicated at A, B, and C, which correspond to and drive different stages (not shown) of the transmission, but which stages may likewise each include a corresponding clutch unit.

The shaft 9 supports and is fixed to a main output gear D disposed between wall 3 and the adjacent end of clutch housing 15; such gear D being of relatively large diameter and driven by the respective stages of the transmission.

The rotary housing 15 is of two-piece construction bolted together intermediate its ends as shown; both ends of said housing being ported for passage of the shafts. One end of the housing 15 is fixed to the adjacent end of shaft 4 by cap screws 23, while the other end of said housing is supported by a bearing 24 on the shaft 9 intermediate the ends thereof. The housing 15 is formed interiorally and substantially centrally of its ends with a pair of annular inwardly divergent female clutch members 25.

A male clutch assembly, heretofore indicated generally at 16, is disposed in housing 15 and comprises a pair of annular inwardly divergent male clutch members 26 arranged in adjacent and matching relation to female clutch members 25; said male clutch members 26 being formed with and supported by disc units indicated at 27 and 28 respectively.

The disc unit 27 includes a tubular sleeve 29 surrounding the shaft 9 with a close running fit, and which sleeve is surrounded by an annular inwardly opening cylinder 30 of which said sleeve forms one side. The sleeve 29 is splined to the shaft 9 at 31 for relative axial sliding movement.

The radially inner end of the disc unit 28 is enlarged as at 32, and rides the shaft 9 in axially spaced relation to the adjacent end of sleeve 29. The disc unit 28 is formed with an annular piston 33, of L-shape in cross section, which projects into cylinder 30 with one side of the piston, which side includes a seal 34, riding the radially outer side of the cylinder, and with the opposite side of the piston splined as at 35 to the exterior of sleeve 29 for relative axial movement.

The above assembly provides an expansion chamber 36 between the free end of piston 33 and the bottom of cylinder 30. A passage 37 leads from shaft 9 between adjacent ends of sleeve 29 and enlarged disc portion 32 (both of which include seals 38), and thence this passage extends between the piston 33 and sleeve 29 to the spline 35, in which certain of the spline teeth are omitted to continue the passage to chamber 36.

The shaft 9 is formed with a lateral passage 39 which communicates at its outer end with passage 37, and at its inner end connects with an axial bore 40 in shaft 9 which opens to the outer end of the latter. At said outer end of the bore the shaft 9 is arranged with a swivel fitting 41 which connects said bore with a conduit 42. This conduit 42, is adapted to be connected with a valve controlled source (not shown) of fluid under pressure.

The clutch members 26 are normally held disengaged from clutch members 25 by the following arrangement:

A plurality of circumferentially spaced rods 43 slidably project in parallel relation to shaft 9 through matching openings in the disc units 27 and 28 between the members 26 and cylinder 30; said rods all being secured at one end to a supporting ring 44, and having a nut 45 threaded on the opposite ends. A pair of loaded compression springs 46 are disposed on each of said rods with the springs engaging between ring 44 and disc unit 28, and between nut 45 and disc unit 27 respectively.

Upon fluid pressure being fed into chamber 36, the corresponding piston and cylinder are moved relatively in opposite directions, causing the clutch members 26 to frictionally engage with the clutch members 25. When this occurs, the shaft 4, together with the continuously rotating housing 15 which is fixed thereto, are coupled in driving engagement with the shaft 9. By reason of the construction of the clutch unit, as described, thrust bearings are unnecessary between housing 15 and the supporting shafts.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A fluid pressure actuated clutch comprising, with a pair of axially alined shafts, a housing concentrically surrounding one shaft in relative rotative relation and being fixed in connection with the other shaft, the housing being formed interiorly with a pair of annular, inwardly divergent female clutch members, and a fluid pressure actuated male clutch assembly mounted on and for rotation with said one shaft and including male clutch members corresponding to and for cooperation with said female clutch members; said male clutch assembly comprising a pair of radially extending, axially movable discs each including a corresponding one of said male clutch members in rigid unitary relation, one disc being formed with an annular cylinder opening toward the other disc, an annular piston on the other disc projecting into the cylinder, spring means urging the discs together, and means to supply fluid under pressure into, or to release the same from, said cylinder, said spring means being a plurality of circumferentially spaced rods slidably projecting through said discs in parallel relation to said one shaft, a pair of compression springs on each rod with the discs engaged therebetween, and spring retaining elements on the ends of said rods, the element at one end of said rods comprising a rigid ring to which all of said rods is connected.

2. A fluid pressure actuated clutch comprising, with a pair of axially alined shafts, a housing concentrically surrounding one shaft in relative rotative relation and being fixed in connection with the other shaft, the housing being formed interiorly with a pair of annular, inwardly divergent female clutch members, and a fluid pressure actuated male clutch assembly mounted on and for rotation with said one shaft and including male clutch members corresponding to and for cooperation with said female clutch members; said male clutch assembly comprising a pair of radially extending, axially movable discs each including a corresponding one of said male clutch members in rigid unitary relation, one disc being formed with an annular cylinder opening toward the other disc, an annular piston on the other disc projecting into the cylinder, spring means urging the discs together, and means to supply fluid under pressure into, or to release the same from, said cylinder; the radially innermost wall of the cylinder providing a hub for said one disc, said hub being splined to said one shaft for relative axial movement.

3. A fluid pressure actuated clutch comprising, with a pair of axially alined shafts, a housing concentrically surrounding one shaft in relative rotative relation and being fixed in connection with the other shaft, the housing being formed interiorly with a pair of annular, inwardly divergent female clutch members, and a fluid pressure actuated male clutch assembly mounted on and for rotation with said one shaft and including male clutch members corresponding to and for cooperation with said female clutch members; said male clutch assembly comprising a pair of radially extending, axially movable discs each including a corresponding one of said male clutch members in rigid unitary relation, one disc being formed with an annular cylinder opening toward the other disc, an annular piston on the other disc projecting into the cylinder, spring means urging the discs together, and means to supply fluid under pressure into, or to release the same from, said cylinder; the radially innermost wall of the cylinder providing a hub for said one disc, said hub being splined to said one shaft for relative axial movement, and the piston being splined to said hub forming side wall of the cylinder for relative axial movement.

4. A fluid pressure actuated clutch comprising, with a pair of axially alined shafts, a housing concentrically surrounding one shaft in relative rotative relation and being fixed in connection with the other shaft, the housing being formed interiorly with a pair of annular, inwardly divergent female clutch members, and a fluid pressure actuated male clutch assembly mounted on and for rotation with said one shaft and including male clutch members corresponding to and for cooperation with said female clutch members; said male clutch assembly comprising a pair of radially extending, axially movable discs each including a corresponding one of said male clutch members in rigid unitary relation, one disc being formed with an annular cylinder opening toward the other disc, an annular piston on the other disc projecting into the cylinder, spring means urging the discs together, and means to supply fluid under pressure into, or to release the same from, said cylinder; said last named means including an annular passage between the discs at the shaft, said shaft being tubular and having a port in communication with said passage, and an axial spline connection between the piston and cylinder, said spline connection having a spline tooth omitted and communicating with said passage.

OSCAR RAYMOND PETERSON.